(12) United States Patent
Xu et al.

(10) Patent No.: US 10,913,218 B2
(45) Date of Patent: Feb. 9, 2021

(54) MOLD AND METHOD FOR MANUFACTURING FRONT WHEEL DISC OF CARBON FIBER COMPOSITE WHEEL

(71) Applicant: CITIC Dicastal CO., LTD., Hebei (CN)

(72) Inventors: Zuo Xu, Qinhuangdao (CN); Donghui Zhang, Qinhuangdao (CN); Wei Zhang, Qinhuangdao (CN); Lateng A, Qinhuangdao (CN); Ling Xiao, Qinhuangdao (CN); Jianqiang Cao, Qinhuangdao (CN); Chunwei Wang, Qinhuangdao (CN); Zhihua Zhu, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 198 days.

(21) Appl. No.: 16/203,868

(22) Filed: Nov. 29, 2018

(65) Prior Publication Data

US 2019/0263077 A1    Aug. 29, 2019

(30) Foreign Application Priority Data

Feb. 28, 2018 (CN) .......................... 2018 1 0168635

(51) Int. Cl.
| | | |
|---|---|---|
| *B29C 70/46* | (2006.01) | |
| *B29C 33/02* | (2006.01) | |
| *B29C 33/44* | (2006.01) | |
| *B29C 70/68* | (2006.01) | |
| *B29C 70/70* | (2006.01) | |
| *B29C 70/54* | (2006.01) | |
| *B29C 70/34* | (2006.01) | |
| *B29K 63/00* | (2006.01) | |
| *B29K 105/08* | (2006.01) | |
| *B29K 307/04* | (2006.01) | |
| *B29K 705/02* | (2006.01) | |
| *B29L 31/32* | (2006.01) | |

(52) U.S. Cl.
CPC .............. *B29C 70/46* (2013.01); *B29C 33/02* (2013.01); *B29C 33/44* (2013.01); *B29C 70/345* (2013.01); *B29C 70/54* (2013.01); *B29C 70/68* (2013.01); *B29C 70/70* (2013.01); *B29K 2063/00* (2013.01); *B29K 2105/0872* (2013.01); *B29K 2307/04* (2013.01); *B29K 2705/02* (2013.01); *B29L 2031/32* (2013.01)

(58) Field of Classification Search
CPC .................................................... B29C 70/345
USPC ........................................................ 264/239
See application file for complete search history.

(56) References Cited

U.S. PATENT DOCUMENTS 8,662,599 B2 *  3/2014  Liao ......................... B60B 5/02
                                                                          301/63.101
2014/0375112 A1 *  12/2014  Werner ..................... B60B 5/02
                                                                          301/63.109

OTHER PUBLICATIONS

English Translation of Liu (CN106182814) (Year: 2016).*

* cited by examiner

*Primary Examiner* — Matthew J Daniels
*Assistant Examiner* — Hana C Page
(74) *Attorney, Agent, or Firm* — Cooper Legal Group, LLC

(57) ABSTRACT

A mold and a method for manufacturing a front wheel disc of a carbon fiber composite wheel relates to a wheel disc, a wheel disc bottom aluminum alloy embedded body, a wheel disc middle aluminum alloy embedded body, a window insert, a top plate, an upper mold, a lower mold, an ejector rod lower plate, an ejector rod upper plate, outer ejector rods, inner ejector rods, a guide post, a bottom plate, upright (Continued)

posts, hydraulic cylinders, lower mold hot runners and upper mold hot runners.

8 Claims, 2 Drawing Sheets

MOLD AND METHOD FOR MANUFACTURING FRONT WHEEL DISC OF CARBON FIBER COMPOSITE WHEEL

CROSS-REFERENCE TO RELATED APPLICATIONS

The present application claims benefit of Chinese Patent Application No. 201810168635.0, filed on Feb. 28, 2018, the contents of which are hereby incorporated by reference in its entirety.

BACKGROUND

Carbon fiber composites with the characteristics of light weight and high strength are increasingly widely used. At present, people desire to manufacture lighter automobile parts to reduce the weight of automobiles, thereby saving energy and improving the controllability of the automobiles. Many automobile wheel manufacturers at home and abroad have tried to use carbon fibers for the production of automobile wheels. Since the reduced mass of a wheel is unsprung mass, the reduction of 1 kg is equivalent to several times the reduction of the sprung mass. Meanwhile, the lightweight of the wheel is beneficial to improving the suspension response speed, reducing the braking distance, enhancing the acceleration performance, improving the control experience, saving energy and reducing emission.

Most of the existing known composite wheels are manufactured using continuous fiber composites and corresponding molding processes. The process is complicated, the process cost is high, and the production efficiency is low. The present disclosure provides a method for molding a wheel disc of a carbon fiber composite wheel, which effectively solves the above problems.

SUMMARY

The present disclosure relates to the field of automobile parts, and specifically, relates to a method for manufacturing a front wheel disc of a carbon fiber composite wheel.

The present disclosure provides a method for manufacturing a wheel disc of a carbon fiber composite wheel, which can effectively reduce the process cost and improve the production efficiency compared with the existing continuous fiber composite wheel manufacturing process.

In one aspect of the present disclosure, provided is a mold for manufacturing a front wheel disc of a carbon fiber composite wheel, including a top plate, an upper mold, a lower mold, an ejector rod lower plate, an ejector rod upper plate, outer ejector rods, inner ejector rods, a guide post, a bottom plate, upright posts, hydraulic cylinders and a window insert, in which the top plate is mounted above the upper mold, and upper mold hot runners are arranged inside the upper mold; the lower part of the lower mold are supported by the inner ejector rods and the outer ejector rods, the inner ejector rods are located at the inner ring of the lower part of the lower mold, and the outer ejector rods are located at the outer ring of the lower part of the lower mold; the lower mold and the upper mold are adjacent to each other and closed to form a cavity in the shape of the front wheel disc of the wheel; between the upper mold and the lower mold, the window insert is arranged in the cavity at a position opposite to a wheel window; the lower ends of the inner ejector rods and the outer ejector rods are connected to the ejector rod upper plate, and the ejector rod lower plate is fixed below the ejector rod upper plate; the hydraulic cylinders are arranged on the ejector rod lower plate to drive the ejector rod lower plate to move up and down; the guide post is arranged on the bottom plate, and the ejector rod upper plate and the ejector rod lower plate are respectively provided with a through hole through which the guide post penetrates.

In a preferred aspect of the present disclosure, the upper mold hot runners are arranged in a vertical and horizontal cross manner, and the lower mold hot runners are arranged in an arc shape and located on a curved surface.

In a preferred aspect of the present disclosure, the inner ejector rods penetrate through holes in the bottom mold and are in contact with the center of the wheel disc.

In a preferred aspect of the present disclosure, the ejector rod lower plate is arranged between the bottom plate and the ejector rods, and the lower parts of the inner ejector rods and the outer ejector rods are in contact with the ejector rod lower plate.

In a preferred aspect of the present disclosure, the four hydraulic cylinders are arranged at the four corners of the mold symmetrically.

In other aspects of the present disclosure, further disclosed is a method for manufacturing a front wheel disc of a carbon fiber composite wheel by using the above-mentioned mold, the method including the steps of: 1) opening the upper mold, putting the window insert into the lower mold, putting the annular wheel disc bottom aluminum alloy embedded body to the lower mold at a position corresponding to the bottom of the wheel disc, and accurately positioning the wheel disc bottom aluminum alloy embedded body through a lower mold positioning column, the size of the wheel disc bottom aluminum alloy embedded body being identical to the size of a center flange plate; 2) heating the lower mold to 70-90° C. through the lower mold hot runners, the raw material used being a 40-60 mm carbon fiber composite prepreg tape, having a fiber mass ratio of 50-65%; 3) vibrating the mold and causing the carbon fiber composite prepreg tape in step 2) to be randomly distributed and densified; 4) placing the wheel disc middle aluminum alloy embedded body above the aluminum alloy embedded body at the center flange plate, and continuously laying the carbon fiber composite prepreg tape having a fiber mass ratio of 50-65% to fully fill the cavity; 5) taking the window insert independent body out, heating the upper mold to 70-90° C. through the upper mold hot runners, and then closing the upper mold; 6) holding the mold under 39.7 MPa at 70-90° C. for 8-12 minutes, then heating the mold to 100-110° C., holding the temperature for 8-12 minutes, next, heating the mold to 130-150° C., boosting the pressure to 41.0-45.0 MPa, and holding the temperature and the pressure for 25-35 minutes; and 7) opening the upper mold, and causing the hydraulic cylinders to drive the ejector rod lower plate and the ejector rod upper plate to move up and down along the guide post, so that the inner ejector rods and the outer ejector rods ascend to eject the carbon fiber composite wheel disc.

In a preferred aspect of the present disclosure, the wheel disc bottom aluminum alloy embedded body is put into the lower mold, and accurately positioned using a lower mold positioning column; then the lower mold is heated to 80° C. through the lower mold hot runners; the raw material used is a 50 mm long carbon fiber composite prepreg tape, having a fiber mass ratio of 60%; short slices are randomly distributed and densified in the cavity by vibrating, and the carbon fiber composite prepreg tape is uniformly and randomly laid in the bottom mold; after the first stage of laying is completed, the wheel disc middle aluminum alloy embedded body is put, and the carbon fiber composite prepreg tape is continuously laid; the window insert independent body is taken out, and the upper mold is heated to 80° C. through the upper mold hot runners; the upper mold is pressed in, and the pressure is set to 39.7 MPa; the mold is held under 39.7 MPa at 80° C. for 10 minutes; the mold is heated to 105° C. and held for 10 minutes; the mold is heated to 140° C., pressurized to 43.6 MPa, and held for 30 minutes; the upper mold is opened, the hydraulic cylinders drive the ejector rod lower plate and the ejector rod upper plate to move up and down along the guide post, and the inner ejector rods and the outer ejector rods ascend to eject the carbon fiber composite wheel disc.

In a preferred aspect of the present disclosure, the carbon fiber composite prepreg tape is composed of continuous carbon fibers and epoxy resin, and the epoxy resin occupies 35-45% by weight of the carbon fiber composite prepreg tape.

In a preferred aspect of the present disclosure, the curing temperature of the epoxy resin is 90-140° C.

During actual production, the upper mold is opened, and the window insert is put into the lower mold; the wheel disc bottom aluminum alloy embedded body is put into the lower mold, and accurately positioned using a lower mold positioning column; then the lower mold is heated to 80° C. through the lower mold hot runners; the raw material used is a 50 mm long carbon fiber composite prepreg tape, having a fiber mass ratio of 60%; short slices are randomly distributed and densified in the cavity by vibrating, and the carbon fiber composite prepreg tape is uniformly and randomly laid in the bottom mold; after the first stage of laying is completed, the wheel disc middle aluminum alloy embedded body is put, and the carbon fiber composite prepreg tape is continuously laid; the window insert independent body is taken out, and the upper mold is heated to 80° C. through the upper mold hot runners; the upper mold is pressed in, and the pressure is set to 39.7 MPa; the mold is held under 39.7 MPa at 80° C. for 10 minutes; the mold is heated to 105° C. and held for 10 minutes; the mold is heated to 140° C., pressurized to 43.6 MPa, and held for 30 minutes; the upper mold is opened, the hydraulic cylinders drive the ejector rod lower plate and the ejector rod upper plate to move up and down along the guide post, and the inner ejector rods and the outer ejector rods ascend to eject the carbon fiber composite wheel disc.

Compared with a method for manufacturing a continuous fiber composite wheel disc, this method can improve the laying efficiency, is low in production cost, and can realize automatic production.

BRIEF DESCRIPTION OF DRAWINGS

An embodiment of the present disclosure will be described in detail below in combination with the accompanying drawings, in which.

Figure 1:
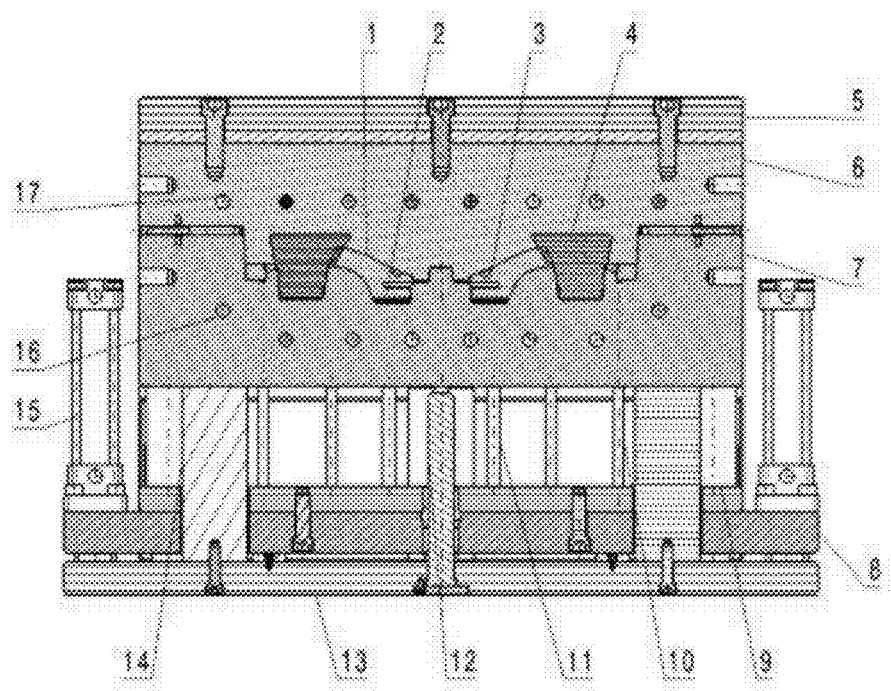
FIG. 1 is a schematic diagram of a method for manufacturing a front wheel disc of a carbon fiber composite wheel according to the present disclosure.
Figure 2:
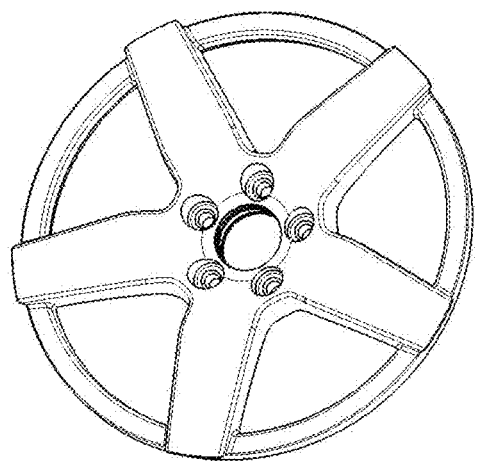
FIG. 2 is a schematic diagram of a front wheel disc of a carbon fiber composite wheel according to the present disclosure.

LIST OF REFERENCE SYMBOLS 1 wheel disc
2 wheel disc bottom aluminum alloy embedded body
3 wheel disc middle aluminum alloy embedded body
4 window insert
5 top plate
6 upper mold
7 lower mold
8 ejector rod lower plate
9 ejector rod upper plate
10 outer ejector rod
11 inner ejector rod
12 guide post
13 bottom plate
14 upright post
15 hydraulic cylinder
16 lower mold hot runner
17 upper mold hot runner

DETAILED DESCRIPTION

Unless otherwise stated, the carbon fiber composite prepreg tape of the present disclosure has a thickness of 420 g/m$^2$.

Embodiment 1

The method relates to a wheel disc 1, a wheel disc bottom aluminum alloy embedded body 2, a wheel disc middle aluminum alloy embedded body 3, a window insert 4, a top plate 5, an upper mold 6, a lower mold 7, an ejector rod lower plate 8, an ejector rod upper plate 9, outer ejector rods 10, inner ejector rods 11, a guide post 12, a bottom plate 13, upright posts 14, hydraulic cylinders 15, lower mold hot runners 16 and upper mold hot runners 17. The top plate 5 is connected with the upper mold 6 by bolts, the hot runners 17 are arranged inside the upper mold 6, and the upper mold hot runners 17 are arranged in a vertical and horizontal cross manner and located in the same plane; the bottom mold 7 is located on the upright posts 14, the hot runners 16 are arranged inside the bottom mold 7, and the lower mold hot runners 16 are arranged in an arc shape and located on a curved surface; and a cavity is formed between the top mold 6 and the bottom mold 7. The ejector rods 10 and 11 are arranged at the bottom of the mold in two rings, the outer ejector rods 10 penetrate through holes in the bottom mold 7 and are in contact with the outer circle of the wheel disc 1, and the inner ejector rods 11 penetrate through holes in the bottom mold 7 and are in contact with the center of the wheel disc 1; the ejector rods 10 and 11 are located on the ejector rod lower plate 8, the ejector rod upper plate 9 is located above the ejector rod lower plate 8, and the ejector rod lower plate 8 is located on the bottom plate 13; and the four hydraulic cylinders 15 are arranged on the ejector rod lower plate 8 symmetrically. The guide post 12 is arranged on the bottom plate 13, and the ejector rod upper plate 9 and the ejector rod lower plate 8 move up and down along the guide post 12. The window insert 4 is an independent body and cooperates with the lower mold 7.

During actual production, the upper mold 6 is opened, and the window insert 4 is put into the lower mold 7; the wheel disc bottom aluminum alloy embedded body 2 is put into the lower mold 7, and accurately positioned using a lower mold positioning column 7; then the lower mold 7 is heated to 80° C. through the lower mold hot runners 16; the raw material used is a 50 mm long carbon fiber composite prepreg tape, having a fiber mass ratio of 60%; short slices are randomly distributed and densified in the cavity by vibrating, and the carbon fiber composite prepreg tape is uniformly and randomly laid in the bottom mold 7; after the first stage of laying is completed, the wheel disc middle aluminum alloy embedded body 3 is put, and the carbon fiber composite prepreg tape is continuously laid; the window insert independent body 4 is taken out, and the upper mold 6 is heated to 80° C. through the upper mold hot runners 17; the upper mold 6 is pressed, and the pressure is set to 39.7 MPa; the mold is held under 39.7 MPa at 80° C. for 10 minutes; the mold is heated to 105° C. and held for 10 minutes; the mold is heated to 140° C., pressurized to 43.6 MPa, and held for 30 minutes; the upper mold 6 is opened, the hydraulic cylinders 15 drive the ejector rod lower plate 8 and the ejector rod upper plate 9 to move up and down along the guide post 12, and the inner ejector rods 11 and the outer ejector rods 10 ascend to eject the carbon fiber composite wheel disc 1.

The invention claimed is:

1. A method for manufacturing a front wheel disc of a carbon fiber composite wheel by using a mold,
   wherein the mold comprises a top plate, an upper mild, a lower mold, an ejector rod lower plate, an ejector rod upper plate, outer ejector rods, inner ejector rods, a guide post, a bottom plate, upright posts, hydraulic cylinders and a window insert, wherein the top plate is mounted above the upper mold, and upper mold hot runners are arranged inside the upper mold; a lower part of the lower mold are supported by the inner ejector rods and the outer ejector rods, the inner ejector rods are located at an inner ring of the lower part of the lower mold, and the outer ejector rods are located at an outer ring of the lower part of the lower mold; the lower mold and the upper mold are adjacent to each other and closed to form a cavity in a shape of the front wheel disc of the wheel; between the upper mold and the lower mold, a window insert is arranged in the cavity at a position opposite to a wheel window; lower ends of the inner ejector rods and the outer ejector rods are connected to the ejector rod upper plate, and the ejector rod lower plate is fixed below the ejector rod upper plate; the hydraulic cylinders are arranged on the ejector rod lower plate to drive the ejector rod lower plate to move up and down; the guide post is arranged on the bottom plate, and the ejector rod upper plate and the ejector rod lower plate are respectively provided with a through hole through which the guide post penetrates, and
   wherein the method comprises the steps of: 1) opening the upper mold, putting the window insert into the lower mold, putting an annular wheel disc bottom aluminum alloy embedded body into the lower mold at a position corresponding to a bottom of the front wheel disc, and positioning the annular wheel disc bottom aluminum alloy embedded body through a lower mold positioning column, a size of the annular wheel disc bottom aluminum alloy embedded body being identical to a size of a center flange plate; 2) heating the lower mold to 70-90° C. through lower mold hot runners, a raw material used being a 40-60 mm carbon fiber composite prepreg tape, having a fiber mass ratio of 50-65%; 3) vibrating the mold and causing the carbon fiber composite prepreg tape in step 2) to be randomly distributed and densified; 4) placing a wheel disc middle aluminum alloy embedded body above the annular wheel disc bottom aluminum alloy embedded body at center flange plate, and continuously laying the carbon fiber composite prepreg tape having the fiber mass ratio of 50-65% to fully fill the cavity; 5) taking the window insert out, heating the upper mold to 70-90° C. through the upper mold hot runners, and then closing the upper mold; 6) holding the mold under 39.7 MPa at 70-90° C. for 8-12 minutes, then heating the mold to 100-110° C., holding the temperature for 8-12 minutes, next, heating the mold to 130-150° C., boosting the pressure to 41.0-45.0 MPa, and holding the temperature and the pressure for 25-35 minutes; and 7) opening the upper mold, and causing the hydraulic cylinders to drive the ejector rod lower plate and the ejector rod upper plate to move up and down along the guide post, so that the inner ejector rods and the outer ejector rods ascend to eject the front wheel disc.

2. The method according to claim 1, wherein the annular wheel disc bottom aluminum alloy embedded body is put into the lower mold, and positioned using the lower mold positioning column; then the lower mold is heated to 80° C. through the lower mold hot runners; the carbon fiber composite prepreg tape used is a 50 mm long and the fiber mass ratio is 60%; slices are randomly distributed and densified in the cavity by vibrating, and the carbon fiber composite prepreg tape is uniformly and randomly laid in the lower mold; after a first stage of laying is completed, the wheel disc middle aluminum alloy embedded body is placed above the annular wheel disc bottom aluminum alloy embedded body, and the carbon fiber composite prepreg tape is continuously laid; the window insert is taken out, and the upper mold is heated to 80° C. through the upper mold hot runners; the upper mold is pressed in, and the pressure is set to 39.7 MPa; the mold is held under 39.7 MPa at 80° C. for 10 minutes; the mold is heated to 105° C. and held for 10 minutes; the mold is heated to 140° C., pressurized to 43.6 MPa, and held for 30 minutes; the upper mold is opened, the hydraulic cylinders drive the ejector rod lower plate and the ejector rod upper plate to move up and down along the guide post, and the inner ejector rods and the outer ejector rods ascend to eject the front wheel disc.

3. The method according to claim 1, wherein the carbon fiber composite prepreg tape is composed of continuous carbon fibers and epoxy resin, and the epoxy resin occupies 35-45% by weight of the carbon fiber composite prepreg tape.

4. The method according to claim 3, wherein a curing temperature of the epoxy resin is 90-140° C.

5. The method according to claim 1, wherein the upper mold hot runners are arranged in a vertical and horizontal cross manner, and the lower mold hot runners are arranged in an arc shape and located on a curved surface.

6. The method according to claim 1, wherein the inner ejector rods penetrate through holes in the lower mold and are in contact with a center of the front wheel disc.

7. The method according to claim 1, wherein the ejector rod lower plate is arranged between the bottom plate and the outer ejector rods and the inner ejector rods, and lower parts of the inner ejector rods and the outer ejector rods are in contact with the ejector rod lower plate.

8. The method according to claim 1, wherein the hydraulic cylinders comprise four hydraulic cylinders symmetrically arranged at four corners of the mold.

* * * * *